Patented June 26, 1923.

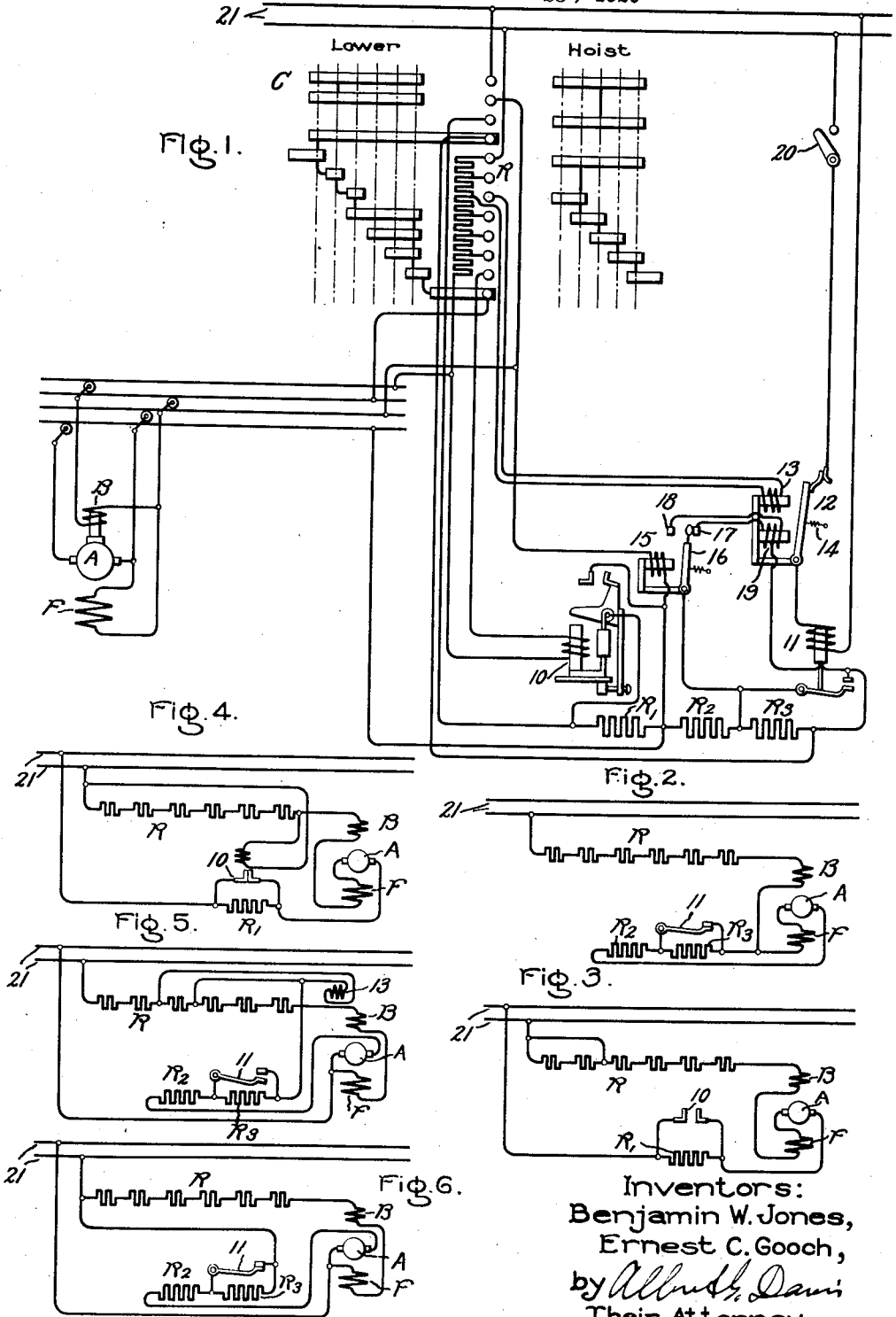

1,460,062

UNITED STATES PATENT OFFICE.

BENJAMIN W. JONES, OF SCHENECTADY, NEW YORK, AND ERNEST C. GOOCH, OF ESTES PARK, COLORADO, ASSIGNORS TO GENERAL ELECTRIC COMPANY, A CORPORATION OF NEW YORK.

MOTOR-CONTROL SYSTEM.

Application filed January 26, 1920, Serial No. 354,086. Renewed November 4, 1922. Serial No. 599,147.

*To all whom it may concern:*

Be it known that we, BENJAMIN W. JONES and ERNEST C. GOOCH, citizens of the United States, residing, respectively, at Schenectady, county of Schenectady, State of New York, and Estes Park, county of Larimer, State of Colorado, have invented certain new and useful Improvements in Motor-Control Systems, of which the following is a specification.

Our invention relates to the control of electric motors, and has for its object the provision of improved means whereby the motor may be started and stopped and in general controlled in a reliable and efficient manner. Although not limited to such use, our invention is particularly applicable to motors intended for reversing, such as are used in hoisting, and it provides improved means for protecting the motor, the control apparatus and the supply circuits from excessive rushes of current when it is attempted to accelerate or retard the motor too quickly.

Our invention relates to an improved arrangement for accomplishing in general the same purposes as the invention of the patent to McLain and Eaton, No. 1,306,548 of June 10, 1919, which is assigned to the same assignee as this invention.

Series motors are ordinarily used for hoisting purposes, and the motor is operated with the series field in series relation with the armature during hoisting. During the lowering interval the field is ordinarily connected in shunt to the motor armature so as to have substantially the speed-torque characteristics of a shunt motor during the lowering operation. This is to provide for obtaining greater speeds lowering than during hoisting, and at the same time to provide for protecting the motor and the hoist from excessive speeds. When the motor is thus connected for lowering, the torque does not increase in the same ratio with the current taken by the motor as it does when the motor is connected as a series motor for hoisting. For this reason, when the operator advances his controller more rapidly than he should, a very excessive current is taken by the armature and the commutation of the motor will very likely be affected, since a series motor is ordinarily designed for good commutation when connected as a series motor, and not when connected as a shunt motor. Further, when the motor reaches its maximum speed in the lowering direction, it may be operating at a speed about twice that of the maximum speed during hoisting. Therefore, when the motor is lowering a load, if the operator attempts to decrease the motor speed he is likely to move the controller more rapidly than he should and thus generate excessive voltage between the commutator bars as well as cause a high current to flow through the motor armature circuit. The combination of these two conditions, namely, high armature current and high voltage between commutator bars, is likely to produce bad commutation. Our invention provides an improved arrangement whereby the motor is automatically protected both during hoisting and lowering, whether the motor speed is being accelerated or the speed is being decreased. A resistor is automatically included in the motor armature circuit during lowering, provided the operator moves the controller too quickly to either accelerate the motor or cause the speed of the motor to be decreased. During accelerating this resistor is included in the motor armature circuit until the speed of the motor has increased to such a value that the resistor may be safely cut out, whereupon the resistor is automatically short circuited. The same thing takes place when it is desired to decrease the speed of the motor and the operator moves his controller too quickly. The resistor is inserted in the motor armature circuit until the motor has had sufficient time to decrease in speed, at which time it is again automatically cut out of circuit. However, if the operator advances his controller at the correct speed or at any speed less than the proper maximum speed, this resistor is short circuited and remains ineffective until abnormal conditions are brought about.

For a better understanding of our invention, reference is had to the accompanying drawing wherein Fig. 1 shows very diagrammatically a motor control system for a hoist; Fig. 2 is a simplified schematic diagram of the motor connections when the controller is in the off position; Fig. 3 is a similar diagram of the motor connections at the first hoisting position of the controller; Fig. 4 is a similar diagram of the connections at the final hoisting position; Fig. 5 is a similar diagram of motor connections at the fourth lowering position of the controller; and Fig. 6 is a similar diagram of the motor connections at the final lowering position.

Referring to Fig. 1, the electric motor having an armature A and series field F is provided with an electromagnet brake B which is normally applied when the motor is deenergized; a reversing controller C is provided for effecting the operation of the motor as a series motor during hoisting and as a shunt motor during lowering, and for varying the motor speed. A starting and controlling resistance R is varied by means of the controller C, and three other resistors $R^1$, $R^2$ and $R^3$ are also provided for varying the motor speed. The arrangement is such that in the off position of the controller, the motor armature and series field are connected in a closed loop which includes the resistance $R^2$ and also the resistance $R^3$ under certain conditions which will be hereinafter fully set forth. The resistor $R^1$ is provided for protecting the motor during hoisting from excessive rushes of current. This resistor is controlled by means of the contactor 10 which is preferably of the series lockout type arranged to hold open when the current is high and to close and be magnetically held closed when the current drops to a predetermined value. The resistor $R^3$ is controlled by means of a contactor 11, the winding of which is controlled by means of a relay 12 which is described and claimed in a copending application of the applicant Benjamin W. Jones and Eugene R. Carichoff, filed November 2, 1920, Serial No. 421,291 and assigned to the same assignee as this invention, the said application being a division of the application of Eugene R. Carichoff and Benjamin W. Jones, Serial No. 354,030, filed January 26, 1920, renewed January 6, 1922, Serial No. 527,520, which describes and claims various arrangements for the use of the said relay in the control of electric motors, and broadly claims the arrangement in which the said relay is used in the present application. The said Carichoff and Jones application, Serial No. 527,520, is assigned to the same assignee as the present application. The resistor $R^2$ is provided for obtaining proper speed torque characteristics for the motor during lowering and to protect the motor from excessive current when the dynamic braking circuit is established at the off position of the controller. The relay 12 is provided with a series coil 13 which is included in the motor circuit in the fourth lowering position, and in that position only. The relay 12 is normally biased to the closed position, that shown in the drawing, by means of a spring 14, or in any other suitable manner. When the coil 13 is energized by current in excess of a predetermined value, the winding of contactor 11 is automatically deenergized by the opening of the contacts of relay 12. Under certain conditions, the closing of this relay is governed by means of a relay 15 having its winding connected in a shunt circuit to the motor armature during lowering, and therefore energized responsively to the counter-electromotive force of the motor. This relay is provided with an armature 16 having a contact element adapted to engage with the contact 17 when the relay is in its open position and to make engagement with the contact 18 when the relay is in its closed position. The winding 19 of the relay 12 is controlled by means of the relay 15, and this winding governs the closing of the relay 12. It will be observed that when the relay 12 is open, the contactor 11 is also open, and that when the contactor 11 is open, either the right-hand or the left-hand section of the coil 19, depending upon the position of the armature 16 of the relay 15, is energized responsively to the voltage drop across the resistor $R^3$. The resistor $R^3$ is provided for protecting the motor from excessive rushes of current, both when the motor is being accelerated and when it is desired to decrease the speed during lowering. It will be observed that the relay 12 is opened responsively to the motor current, after which the closing of the relay is governed by means of the coil 19, and that the closing of the relay is responsive to the current taken by the motor and also to the motor speed. Thus, when the contactor 11 is opened, either the right or left-hand portion of the coil 19 is connected across the resistor $R^3$, and it is therefore energized responsively to the motor armature current. It will be observed that the contactor 11 is also governed in closing responsively to the counter-electromotive force of the motor by means of the relay 15. If the motor current is in excess of the predetermined value, when the controller is turned to the fourth or the two subsequent positions lowering, the winding 13 will open the relay 12 at the fourth position, deenergizing the contactor 11 and automatically inserting the resistor $R^3$ in the motor armature circuit. In case the motor is not accelerated to the proper speed, or the current taken by the motor is in excess of the predetermined value, the winding 19 will not permit the relay 12 to close its contacts, since the drop across the resistor $R^3$ is greater than that at which the relay 12 is set to close. It will also be observed that the opening and closing values of the relay 12 can be adjusted independently of each other.

The motor is also protected when operating in the lowering direction in case the controller is moved too quickly from either of the last three lowering positions of the controller to the off position or to either of the first three lowering positions. The resistor R³ will be included in the motor armature circuit until the current taken by the motor and the motor speed has decreased to the predetermined value.

It will be observed that the relay 12 can be adjusted to exactly meet the conditions required during accelerating and the relay 15 can be adjusted to meet the conditions exactly when it is desired to decrease the motor speed so that the combination of these two relays exactly meets all the conditions imposed for successful operation.

As thus constructed and arranged, the operation of our invention is briefly as follows: With the parts in the position shown on the drawing, the pilot switch 20 will first be closed, thereby energizing the winding of the contactor 11 to close and short circuit the resistor R³, the circuit for the winding of the contactor being through the contacts of the relay 12. With the controller in the off position, the motor will be disconnected from the source of supply 21 and the motor armature and series field will be connected in a closed circuit including the contacts of the contactor 11 and the resistor R². This provides a local dynamic braking circuit of the motor in the off position of the controller. If it is desired to hoist a load, the controller C is turned to the left, thereby establishing the connections for the motor as shown in Fig. 3. A portion of the resistor R is thus included in the motor circuit and also the resistor R¹. The brake coil B is energized in series with the motor and the brake will be raised so as to permit the motor to hoist the load, the motor operating in this connection as a series motor. The motor will be accelerated in the usual manner by continuing the movement of the controller C to the left, thereby short circuiting step by step the starting resistor R. In the final hoisting position of the controller, the winding of the series contactor 10 will be included in the motor circuit, and this contactor will hold open until the current taken by the motor has decreased to the predetermined value at which the contactor will automatically close and short circuit the resistor R', establishing the connections as shown in Fig. 4. If the controller is returned to the off position, the motor will be included in the local dynamic brake circuit as previously described, and the electromagnet brake will be applied.

If it is desired to lower the load, the controller C is turned to the right. At the first operative position lowering, the series field F and brake coil B are connected in series with a portion of the resistor R in a shunt circuit to the motor armature connected in series with the resistor R², the resistor R³ being shorted by the contactor 11. In the second and third position lowering, sections of resistor R are progressively included in the motor field circuit so as to accelerate the motor. In the fourth position lowering, the coil 13 of the relay 12 is included in the motor circuit and is energized responsively to the current taken by the motor. The relay 12 will therefore be positively energized to always open its contacts in the fourth position lowering, thereby deenergizing the contactor 11 and including the resistor R³ in the motor armature circuit, as shown in Fig. 5. This resistor will prevent an excessive rush of current at this point of the controller. The opening of contactor 11 energizes the winding 19 of the relay 12 responsively to the voltage drop across the resistor R³ and the relay 12 will not close its contacts until the current taken by the motor has dropped to the predetermined value. When the controller is moved to the fifth or sixth position lowering, the coil 13 of the relay 12 will be deenergized, so that in case the controller is moved from the first position lowering to the fifth directly, the relay 12 will be automatically opened at the fourth position and be maintained opened by the coil 19 which is energized responsively to the motor current, thereby protecting the motor from the dangerous conditions resulting from moving the controller too quickly in lowering. The coil 19 is also controlled responsively to the speed of the motor by means of the relay 15 which is energized in the lowering position responsively to the counter-electromotive force of the motor, so that in case the motor speed should increase to such a value that it would be safe for the resistor R³ to be short circuited, the relay will pick up its armature 16, thereby deenergizing the left-hand coil of the winding 19. During the interval between the braking of the circuit for the left-hand coil and the making of the circuit for the right-hand part of the coil 19, the relay 12 will automatically close its contacts due to the bias to the closed position caused by the spring 14. The closing of the contactor 11 with the controller C at the last position lowering establishes connections as shown in Fig. 6, this being the full running position lowering. If it now is desired to reduce the speed of the motor, the controller C is turned backward toward the off position. At the fourth position the coil 13 of the relay 12 will be energized to open the contacts of the relay and thereby cause the resistor R³ to be included in the motor armature circuit. The speed of the motor will now be such that the armature of the counter-electromotive force relay 15 will be in its attracted position and the right-hand part of the coil 19 of relay 12 will be energized to hold the relay 12 open until the motor armature current has decreased to the proper value or the speed of the motor has decreased to such a value that the relay 15 will permit its armature to be released in accordance with its bias, thereby deenergizing the right-hand part of the coil 19. When the relay 15 operates, it reverses the current in coil 19 and the opening of the relay 12 will be positive even though the contact 16 moves very quickly. It will thus be seen that the motor is protected in accordance with the current taken by the motor and also in accordance with the speed of the motor during lowering, and that the controller can be moved quickly from one operative position to another or from any operative position to the off position directly without damage to the motor, since the resistor is automatically included in the motor armature circuit until either the current taken by the motor has decreased to the proper value or the speed of the motor has either increased or decreased as the case may be, to the proper value.

It will be obvious to those skilled in the art that while we have shown our invention embodied in an arrangement for controlling a series wound motor, our invention is not limited thereto, since it is applicable to the control of other types of electric motors as well.

What we claim as new and desire to secure by Letters Patent of the United States is:—

1. The combination with an electric motor having a series field and speed varying controller therefor having means for connecting the motor to a source of supply with the series field and armature in shunt circuits, of a normally short circuited resistance in the motor armature circuit, an electromagnetic switch biased to one position for controlling said resistance, the said switch having two windings, one of which is temporarily energized responsively to the motor current to effect the movement of said switch against its bias, and include the said resistance in the motor armature circuit when the said controller is moved to vary the motor speed, and the other winding is connected across the resistance for subsequently governing the operation of the switch to its biased position to control the short circuiting of the said resistance.

2. The combination with an electric motor having a series field and a controller therefor for connecting the motor to a source of supply with the series field and armature in shunt circuits, of a resistance in the motor armature circuit, an electromagnetic switch for short circuiting the resistance, a normally closed relay controlling the winding of the electromagnetic switch, the said relay having two windings, one of which is temporarily energized to open the relay and cause the electromagnetic switch to include the resistance in the motor armature circuit, and the other of which is thereupon energized responsively to the motor armature current to govern the closing of the relay and the short circuiting of the resistance.

3. The combination with an electric motor and a controller therefor for connecting the motor to a source of supply, of a resistance in the motor armature circuit, an electromagnetic switch biased to one position for controlling said resistance, the said switch having two windings, one of which is temporarily energized responsively to the motor current to effect the movement of said switch against its bias, and the other winding is connected across the resistance for governing the operation of the switch to its biased position, and means for governing the operation of the switch to its biased position responsively to the motor speed.

4. The combination with an electric motor and a controller therefor for connecting the motor to a source of supply, of a resistance in the motor armature circuit, an electromagnetic switch for short circuiting the resistance, a normally closed relay controlling the winding of the electromagnetic switch, the said relay having two windings, one of which is temporarily energized to open the relay and cause the electromagnetic switch to include the resistance in the motor armature circuit, and the other of which is thereupon energized responsively to the motor armature current to govern the closing of the relay and the short circuiting of the resistance, and means for governing the closing of the relay responsively to the motor speed.

5. The combination with an electric motor and a controller therefor for connecting the motor to a source of supply, the said controller having a plurality of operative positions for varying the motor speed, of a resistance in the motor armature circuit, an electromagnetic switch biased to one position for controlling the said resistance, the said switch having two windings, one of which is energized at an intermediate operative position of the controller to effect the movement of said switch against its bias and the other winding is energized responsively to the motor armature current and the speed of the motor for governing the operation of the switch to its biased position.

6. The combination with an electric motor and a controller therefor for connecting the motor to a source of supply, of a resistance in the motor armature circuit, an electromagnetic switch biased to one position for controlling said resistance, said switch having two windings, one of which is temporarily energized to an intermediate position of the controller to effect the movement of said switch against its bias and the other of which is energized responsively to the motor current for governing the operation of the switch to its biased position, and a relay having its winding energized responsively to the motor speed for controlling the said other winding of the electromagnetic switch responsively to the motor speed.

7. The combination with an electric motor having a series field and a controller therefor for connecting the motor to a source of supply with the series field and armature in shunt circuits, the said controller having a plurality of operative positions for varying the motor speed, a resistance in the motor armature circuit, an electromagnetic switch for short circuiting the resistance, a normally closed relay controlling the winding of the electromagnetic switch, the said relay having two windings, one of which is energized only at an intermediate operative position of the controller to open the relay and cause the electromagnetic switch to include the resistance in the motor armature circuit and thereby energize the second winding responsively to the voltage drop across the resistor so as to maintain the relay open, and a second relay having a winding energized responsively to the counter-electromotive force of the motor for controlling the second winding of the first mentioned relay responsively to the motor speed.

In witness whereof, BENJAMIN W. JONES has hereunto set his hand this 6th day of January, 1920, and ERNEST C. GOOCH has hereunto set his hand this 13th day of January, 1920.

BENJAMIN W. JONES.
ERNEST C. GOOCH.